United States Patent [19]
Bresowar

[11] Patent Number: 5,486,341
[45] Date of Patent: Jan. 23, 1996

[54] ENTRAINMENT SEPARATOR FOR HIGH VELOCITY GASES

[75] Inventor: Gerald E. Bresowar, Homewood, Ala.

[73] Assignee: ABB Environmental Systems, Div. of ABB Flakt, Inc., Birmingham, Ala.

[21] Appl. No.: 257,085

[22] Filed: Jun. 9, 1994

[51] Int. Cl.[6] .............................. B01D 53/50; B01D 53/78
[52] U.S. Cl. .................................. 423/243.01; 423/242.1; 423/243.08; 423/243.09; 95/216; 95/235
[58] Field of Search ........................ 423/243.09, 243.08, 423/243.01, 242.1; 95/235, 216

[56] References Cited

FOREIGN PATENT DOCUMENTS

| | | | |
|---|---|---|---|
| 3008718 | 9/1981 | Germany | 423/243.01 |
| 3706533 | 1/1988 | Germany | 423/243.08 |
| 62-282625 | 12/1987 | Japan | 423/243.08 |

OTHER PUBLICATIONS

Jones, McIntush, Lunden, Rhudy, Bowen, Mist Elimination System Design & Specification for FGD Systems, SO$_2$ Control Symposium, Boston, Mass., Aug. 26, 1993.

Radar and Bakke, Incorporating Full–Scale Experience into Advanced Limestone Wet FGD Designs, IGCI Forum '91, Washington, D.C., Sep. 12, 1991.

Rosenberg and Koch, Report—Battelle's Stack Gas Emissions Control Coordination Center Group, Battelle Memorial Institute, Jul. 10, 1989.

Primary Examiner—Gary P. Straub
Assistant Examiner—Timothy C. Vanoy
Attorney, Agent, or Firm—St. Onge Steward Johnston & Reens

[57] ABSTRACT

Sulfur oxides (SO$_x$) are scrubbed from combustion effluents with aqueous limestone slurries with greater efficiency due to the use of an improved entrainment separator. In the preferred embodiment of a single-loop, counter-current limestone wet scrubber operating at bulk gas flow rates of greater than 4.5 meters per second, a vertical stream of flue gas is freed of a substantial portion of slurry droplets and diverted for effective mist removal by a well-drained, horizontal-flow mist eliminator. The entrainment separator is a single-pass device with individual blades aligned for effective operation with reduced droplet impingement on the upper walls (e.g., roof) of the scrubber and to permit periodic washing.

9 Claims, 3 Drawing Sheets

ENTRAINMENT SEPARATOR FOR HIGH VELOCITY GASES

TECHNICAL FIELD

The invention relates to improvements in separating liquid droplets from gas streams with greater efficiency and reliability and, in preferred form, enabling the removal of sulfur oxides ($SO_x$) from combustion effluents. The invention is particularly applicable and useful for limestone-based wet scrubbing systems which employ counter-current contacting open spray towers to absorb $SO_x$ from effluent flue gases, and in particular, to open spray towers that operate at very high superficial gas velocities in order to improve contacting efficiency.

A number of industrial processes rely on contacting gas streams at high velocity with droplets of liquid and, then, separating the gas and the liquid. Among these, are various scrubbing processes such as those employed to remove sulfur oxides from combustion effluents.

Combustion of materials containing sulfur (e.g., fuels such as oil and coal) produces a variety of oxides of sulfur which are referred to as a group as $SO_x$. Regulations require reduction of $SO_x$ emissions. One efficient method for treating combustion effluents to remove $SO_x$ is limestone-based wet scrubbing. Limestone-based wet scrubbing technology is well developed and effective; however, very large equipment is required and costs are proportional. It would be desirable to permit the use of high gas velocities for a number of reasons explained in copending, commonly-assigned U.S. patent application Ser. No. 08/257,693, filed concurrently with the present application in the names of G. E. Bresowar, J. Klingspor, and E. Bakke.

Unfortunately, the use of high gas velocities in counter-current gas-liquid contactors, such as open spray towers, has the tendency to make the removal of entrained liquid droplets more difficult and aggravates problems associated keeping the mist elimination devices clean and with droplets impacting scrubber walls, roofs, and other equipment. Fouled mist eliminators in such processes tend to plug because the fouling liquid is supersaturated with calcium sulfate. Encrusted walls, roofs, and other equipment can increase pressure drops through the equipment and can periodically result in large pieces of deposited solids breaking off and damaging other important processing equipment, such as spray headers, nozzles, bracing, and so forth. In addition, solids from such fallout can enter the liquid or slurry processing system and cause plugging of nozzles, therefore compounding the degradation of system reliability. It would be desirable to have an improved apparatus for removing entrained liquid droplets (e.g., scrubbing slurries) from rapidly-moving gas streams (e.g., combustion effluents).

Liquid entrainment separators, to be effective for their purpose, must cause liquid droplets to impinge on one or more surfaces to drop the liquid out of the gas. The surfaces must be easily drained and easily washed. They also must not significantly contribute to reentrainment of the liquid. It is preferred in many situations to employ a vertically-oriented mist eliminator, but these are not practical if it means that the gas stream must be turned from the vertical by contact with passage walls. Encrustation and its attendant problems would be the result.

It would be desirable to improve wet scrubbing and other technologies depending on gas-liquid contact with the removal of entrained liquid from the effluent gas by enabling more efficient removal of entrained liquid droplets with high throughput, low pressure drop and low tendency to cake or encrust with solids carried in the liquid.

BACKGROUND ART

The technology for wet scrubbing combustion effluents to remove $SO_x$ provides gas-liquid contact in a number of different configurations. Among the most prominent are the open countercurrent spray towers and towers which employ packings or trays. In the vast majority of these designs, gas flows vertically upward and the liquid flows downward, under the influence of gravity. The use of a variety of reagents has been suggested, but the most preferred are those which can be purchased at low cost and stored and transported with minimal special handling. Calcium carbonate (commercially available in a number of forms, including limestone) is a material of choice because it meets these criteria and, when properly processed, yields process byproducts that can be easily disposed of as landfill or sold as gypsum.

The design and operation of single-loop, countercurrent spray towers utilizing limestone is discussed by Rader and Bakke, in Incorporating Full-Scale Experience Into Advanced Limestone Wet FGD Designs, a paper presented at the IGCI Forum '91, Sep. 12, 1991, in Washington, D.C. Open spray towers (i.e., those not having packings, trays or other means for facilitating gas-liquid contact) are presented as simple in design and of high reliability for flue gas desulfurization (FGD). The authors do not extensively discuss entrainment separators, but do show a two-stage mist eliminator and describe top and bottom washing.

A thorough discussion of conventional and commercially available mist eliminators is discussed by Jones, McIntush, Lundeen, Rhudy, and Bowen, in Mist Elimination System Design and Specification for FGD Systems, presented Aug. 26, 1993, at the 1993 $SO_2$ Control Symposium, Boston, Mass. The authors show through extensive testing in a special test rig that high, vertically-upward gas velocities (i.e., those greater than about 4.5 meters per second) in a spray zone are difficult to effectively demist because of a phenomena known as "breakthrough". Breakthrough occurs when the mist eliminator effectively is flooded with liquid due to inadequate drainage. Various mist eliminator designs experience this breakthrough at different gas velocities, depending on the vagaries of the particular design. However, in general, no mist eliminator is satisfactory in vertically upward gas flow above 4.5 meters per second, and all are at risk to experience breakthrough.

It would be desirable to provide mist elimination which was effective at gas velocities even higher than 4.5 meters per second disclosed by Rader and Bakke. One major supplier of vertical flow, limestone-based FGD systems has a mist eliminator design proven suitable for gas velocities in the spray zone greater than 4.5 meters per second. The design is described most typically by the mist eliminator system at N. V. Provinciale Zeeuwse Energie-Maatschappij's Borsselle Power Station, Unit 12, located in the Netherlands, illustrated quite satisfactorily by Rosenberg and Koch in the Jul. 10, 1989 report from Battelle's Stack Gas Emissions Control Coordination Center Group. The design is based on a horizontal flow mist eliminator oriented circumferentially about and above the vertical flow spray zone. Entrained slurry from the spray zone must travel up, then make a radial turn outwardly to pass through the mist eliminator. The mist eliminator operates at a superficial face velocity much lower than that in the spray zone of the tower, indeed less than 20% of the spray zone gas velocity. Further, the upper portions of the mist eliminator are under-utilized while the lower portions, those closest to the spray zone, handle most of the flue gas and entrained slurry. Such a unit as shown at Borsselle is expensive to construct and maintain. Should the Borsselle design be made shorter to lower the cost, then it could be and should be anticipated that severe roof deposits would occur due to impingement of vertically-directed droplets from the spray zone that did not make the turn into the mist eliminator. So while it is readily acknowledged and common practice to operate horizontal flow mist eliminators in limestone-based FGD service at gas velocities of 4.5 to 6.0 meters per second, the Borsselle design cannot be operated this way because of risk of roof deposits.

Impingement of slurry droplets on surfaces upstream or downstream of mist eliminators in limestone-based FGD systems is not desirable. Impinged droplets that do not disengage as droplets, i.e., are not washed off or slough off under their own weight, will form scale deposits as the dissolved calcium ions precipitate with absorbed sulfite oxidized to sulfate. These gypsum scale deposits will tend to build on themselves, growing at a substantial rate until mechanical forces or their sheer weight causes them to break off. This is a very undesirable situation which can, and has, caused serious damage to spray tower internals and other equipment.

The prior art does not directly address the points necessary to achieve improvements in removal of entrained liquid droplets in FGD scrubber gas streams moving vertically at velocities more than 4.5 meters per second without creating problems of the type mentioned above.

DISCLOSURE OF THE INVENTION

It is an object of the invention to improve the design and location of entrainment separators installed upstream of horizontal flow mist eliminators in gas-liquid contact equipment.

It is another object of the invention to improve the design and location of entrainment separators in single-loop, open-tower, countercurrent limestone wet scrubbers to permit effective removal of entrained liquid droplets in gases moving vertically upward at high velocity.

It is yet another object of the invention to improve the design and location of entrainment separators in single-loop, open-tower, countercurrent limestone wet scrubbers to permit effective removal of entrained liquid droplets in gases moving vertically upward at high velocity and to change the direction of flow away from the roof of the scrubbing tower.

It is another specific object of the invention to enable increasing the capacity and performance of single-loop, open-tower, countercurrent limestone wet scrubbers by increasing the gas velocity therethrough, without encountering large pressure drops from demisting, excessive encrustation on scrubber walls (especially roofs), plugging of the entrainment separator, and plugging or droplet breakthrough of the mist eliminator.

It is still another specific object of the invention to enable increasing the capacity and performance of single-loop, open-tower, countercurrent limestone wet scrubbers by increasing the gas velocity therethrough, turning the gas direction toward a final, horizontal flow mist eliminator, and establishing a relatively uniform velocity profile for gas entering the final mist eliminator.

These and other objects are accomplished by the invention which provides both improved methods and apparatus for wet scrubbing, particularly scrubbing effluents from the combustion of sulfur-containing fuels such as coal and solid waste.

In one aspect, the invention provides an improved wet scrubbing process for reducing the concentration of $SO_x$ in flue gases, comprising: directing a flow of flue gas upwardly through a scrubbing tower; introducing a spray of droplets of an aqueous slurry of finely-divided calcium carbonate, calcium sulfate, calcium sulfite, and other non-reactive solids, to contact the flue gas in a vertical scrubbing section, the slurry descending through the tower countercurrently to the flow of flue gas and being collected as a liquid after contact; passing the flue gas through a single pass entrainment separator positioned above and across the vertical scrubbing section at an angle to the flow effective to reduce the quantity of droplets entrained in the gas and to also turn the direction of flow of the flue gas. The entrainment separator is preferably effective to reduce the quantity of droplets by at least 40% and to also turn the direction of flow of the flue gases by at least 45° from the vertical axis of the tower. The flue gas is then passed through a well-drained, horizontal-flow mist eliminator downstream of the entrainment separator. In the preferred embodiment of single-loop, open-tower, countercurrent limestone wet scrubbers, the bulk gas velocity in the vertical scrubbing section is greater than about 4.5 meters per second.

Also preferably, the entrainment separator is oriented at an angle relative to the horizontal in the scrubbing tower, within the range of from about 10 to about 45°, and preferably causes a low pressure drop of less than about 0.15 inches of water, but yet removes at least 40% of droplets while consolidating a substantial portion of the remaining droplets into larger size fractions which can more readily be removed by downstream horizontal-flow mist eliminator.

In the preferred form, the entrainment separator utilizes single pass separator blades to collect droplets by impingement and to turn the gas in a direction most suitable for further mist elimination. The individual blades are held parallel to one another in each of a plurality of assemblies. The individual blades are oriented at an angle within the range of from about 45° to about 55° from the vertical. Typically, the individual blades are parallelogram-shaped pieces of from about 15 to about 23 centimeters in minor dimension and from about 60 to about 150 centimeters in major dimension. Also typically, the spacing between individual blades will typically be from about 40 to about 70% of the minor dimension of the individual blades. A plurality of assemblies of individual blades are preferably oriented at an angle in the range of from about 120° to about 150° with respect to one another to form a chevron pattern. The blades are preferably washed periodically by spraying wash water directly onto the blades from both the top and the bottom.

BRIEF DESCRIPTION OF THE DRAWINGS

The invention will be better understood and its advantages will be better appreciated from the following detailed description, especially when read in light of the accompanying drawings, wherein.

INDUSTRIAL APPLICABILITY

Figure 1:
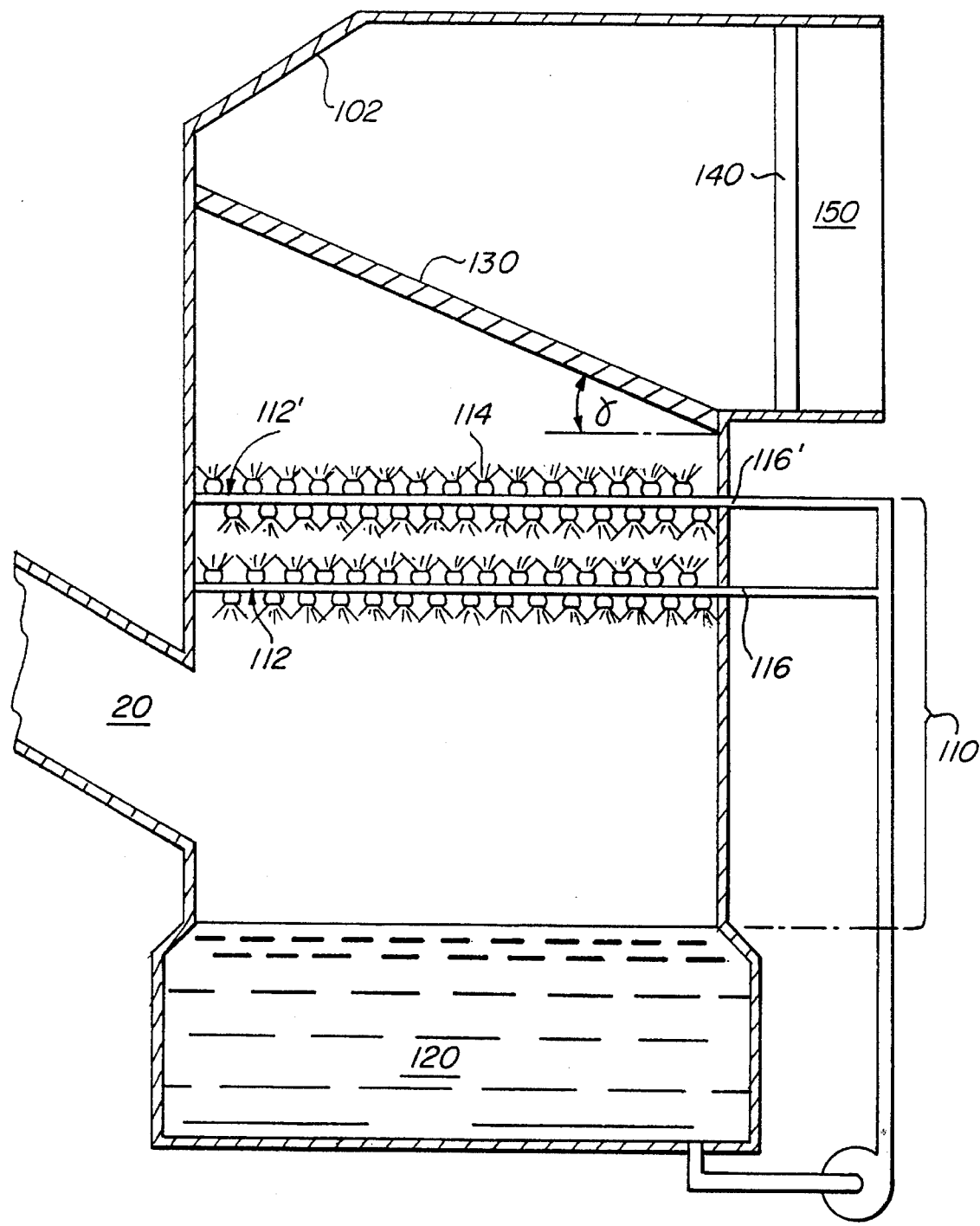
FIG. 1 is a schematic view of a preferred embodiment of the process of the invention employing a single-loop, open-tower, countercurrent limestone wet scrubber.

The following description is centered on the preferred embodiment of FIG. 1 which is a single-loop, open-tower, countercurrent limestone wet scrubbing operation for removing sulfur oxides, principally as $SO_2$, from combustion effluents. It will be apparent from the following description, however, that the technology of the invention has application to other gas-liquid operations and to other types of scrubbers.

The preferred process scheme of FIG. 1 shows an effluent, such as from a coal-fired industrial or utility boiler, entering wet scrubber 100 via inlet duct 20. The gas flows upwardly through vertical scrubbing section 110 in the tower, countercurrent to a spray of an aqueous slurry which contains finely-divided limestone discharged from a bank of spray nozzles 112 and 112'. The spray is broken into droplets in the tower. The bulk gas velocities according to the invention are above 4.5, and preferably from about 5 up to about 6, meters per second. These gas velocities are desired for single-loop, open-tower wet limestone scrubbers because they facilitate the treatment of flue gases with lower relative amounts of aqueous slurry, e.g. lower L/G ratios.

Limestone is the preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably. The limestone is preferably finely divided, preferably to a weight median particle size of less than about 8μ as introduced.

The sulfur oxides in the effluent are absorbed into the aqueous phase of the slurry and react with available calcium to form calcium sulfite, principally, which can then be oxidized to form calcium sulfate. The reaction occurs to some extent in the falling droplets, but is effected mainly in reaction tank 120 which collects the slurry.

The scrubbed effluent passes through an entrainment separator 130 of the invention where a substantial portion of the entrained droplets are removed and where the effluent flow is diverted in direction. The bulk of the effluent flow is changed from vertical to near horizontal. This has several advantages including the reduced impingement of slurry onto the roof 102 of the scrubbing tower. Also, and importantly, it permits high effluent velocities with high demisting efficiency by demisting an essentially horizontal flow through vertical mist eliminator 140. The high gas velocities in the vertical scrubbing section 110 in turn have the advantage that they better fluidize the droplets of scrubbing slurry giving each droplet a greater contact time with the effluent for a given tower height. The scrubbed and demisted effluent can then be discharged through duct 150.

At the high gas velocities desired for improvement of the FGD process, problems of encrustation of the roof 102 of the tower and of the mist eliminators of conventional construction would be experienced unless measures afforded by the invention were taken. This encrustation can occur wherever entrained slurry liquid is allowed to gather and not be washed or drained off the surfaces. The entrained slurry can quickly become supersaturated with calcium sulfate, thereby precipitating a gypsum scale deposit which can grow to a severe encrustation. When severe, encrustion can increase the pressure drop through the scrubber and cause large pieces to break off and fall into the spray tower—potentially damaging headers, nozzles, or support members, and potentially falling through to the reaction tank 120, where such deposits can be transported by the recycle pump to the headers 112 and 112', causing plugging of the spray nozzles 114. The use of more efficient mist eliminators in lieu of an entrainment separator might be considered an effective solution; however, for reasons previously described, mist eliminators are largely ineffective at the vertical gas velocities of about 4.5 to about 6.0 meters per second. Without the invention, the high velocities are not practical due to the deposits which will occur on the roof 102.

It might be asserted that simply washing the roof 120 and exposed surfaces with fresh water might be adequate to prevent encrustation without employment of the invention. However, while this may indeed be feasible, the invention has other advantages that are not afforded by simple washing of the exposed surfaces. Use of the invention achieves these other advantages simultaneously while making it unnecessary to wash the exposed surfaces.

The invention positions a single pass entrainment separator 130 above and across the vertical scrubbing section 110. The design and location of the entrainment separator 130 are effective to reduce the quantity of moisture droplets and to also turn the direction of flow of the flue gases to an orientation effective for efficient utilization of a high efficiency, horizontal-flow mist eliminator. The entrainment separator 130 is illustrated in FIG. 1 as oriented at an angle Y relative to the horizontal in scrubbing tower 100. This angle will preferably be within the range of from about 10° to about 45°, e.g. about 20°.

Figure 2:
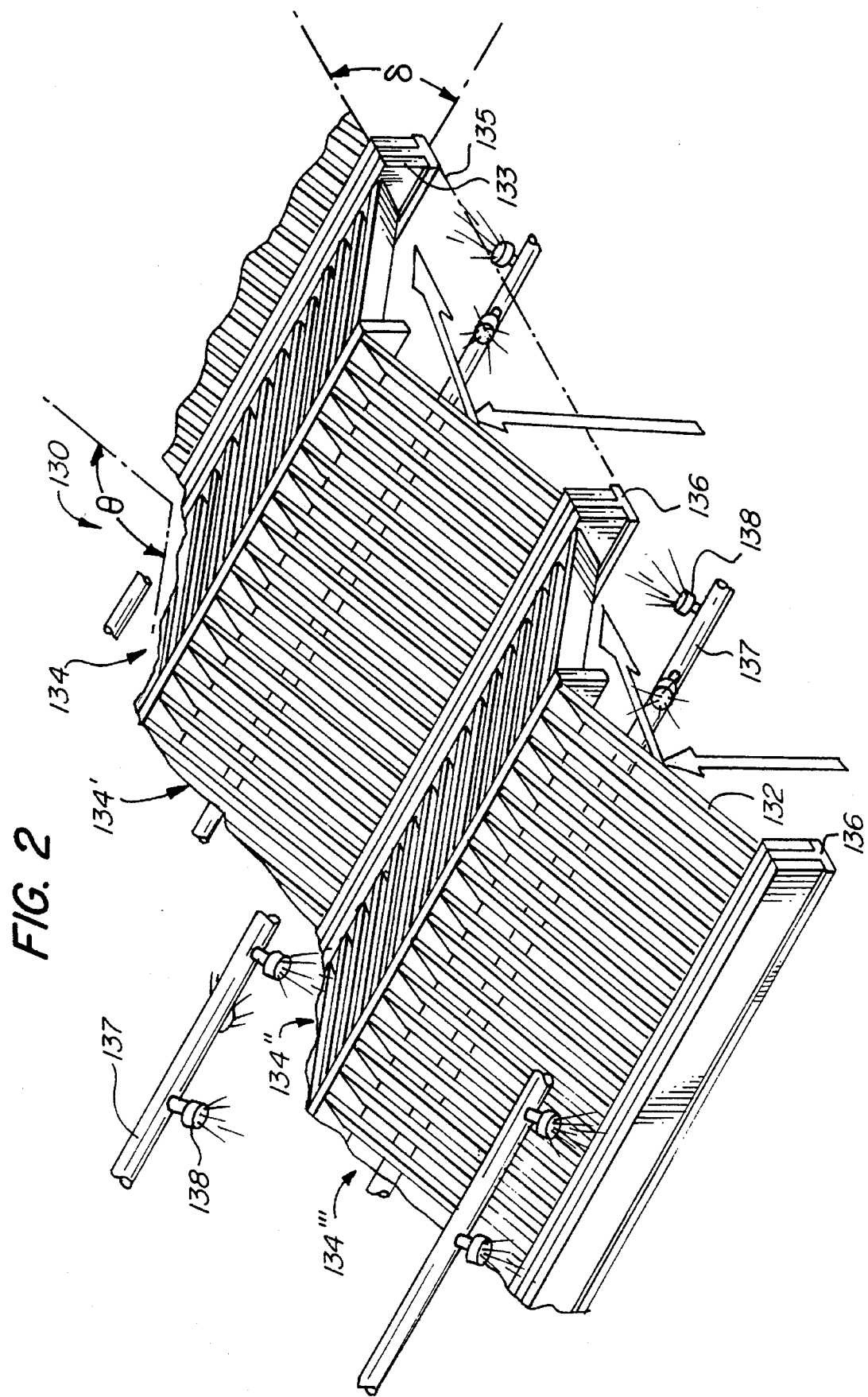
FIG. 2 is a perspective view of the entrainment separator shown in the spray tower of FIG. 1.

The preferred form of the separator 130 is shown in FIG. 2 to utilize single pass separator blades 132 to collect droplets by impingement and to turn the gas in a direction most suitable for further mist elimination and, preferably, away from direct impingement with the upper wall 102 of the scrubbing tower. The individual blades 132 are mounted in frames 133 to form assemblies 134, 134', etc. As shown, the assemblies are composed of many blades, but the actual number of blades per assembly will vary depending on the desired weight of each assembly, that weight being such that one or two maintenance personnel can readily install or remove an assembly as required. Typically about three to six blades will makeup one assembly. The assemblies are arranged adjacently to make the entire entrainment separator array. The lower edges of the frames 133 define a lower surface 135 of the assemblies 134, etc. The individual blades 132 are oriented at an angle δ with respect to the vertical. Typically, a blade of this type will be a rectangular piece of from about 15 to about 23 centimeters in minor dimension and from about 60 to about 150 centimeters in major dimension. Spacing between individual blades will typically be from about 40 to about 70% of the minor dimension of the individual blades. Angle δ will preferably be within the range of from about 35° to about 55°, the exact value depending on the desired degree of flow direction of the effluent stream.

The assemblies 134, etc., are constructed and oriented in a fashion that facilitates excellent drainage. The individual assemblies arranged in a pattern of chevrons as illustrated. The assemblies 134, etc., are preferably oriented at an angle Θ, typically in the range of from about 120° to about 150°, and preferably in the range of from about 125° to about 145°. The entrainment separator structure is supported by members 136 which run the lengths of each of the assemblies. Other arrangements of supporting structures are possible. While shown in rectangular sections in the Figure, the scrubbing tower will typically have a round cross section, and the assemblies near the wall will have to be shaped appropriately.

The structure of the entrainment separator 130 permits direct contact washing of the blades by means of fixed nozzle lances 137 having spray nozzles 138 capable of spraying wash water directly on to the blades from both the top and the bottom. Washing is typically done by operating each washer header separately and sequentially with the others, however other washing schemes are possible. For instance, it may be more convenient to operate two headers simultaneously. The wash water is of sufficient quality and is used in sufficient quantity to reduce the level of saturated, dissolved salts on the separator surfaces. Typical wash rates while a header is operating may be about 16 to about 60 liters per minute per square meter of area. Washing on the top of the entrainment separator will generally be in this same range, but less frequently then on bottom. It is preferred that washing the top and bottom of the assemblies occurs routinely, that is, at frequent cycles to prevent buildup of gypsum deposits. Together with the good drainage afforded by the chevron-shaped arrangement of assemblies 134, etc., the use of high quality wash water and frequent washing affords practically deposit-free operation. However, the washing sequence and water may vary depending on the needs of the FGD process.

It is a feature of the invention that the separation efficiency of the entrainment separator need not be as high as multipass separators employed in the prior art because the ability to redirect the flow from vertical to horizontal enables the use of a high-efficiency, horizontal-flow mist eliminator 140. Thus, even though the entrainment removal efficiency is lower than might be thought desirable for wet scrubbing towers, the entrainment separator produces very low pressure loss, e.g. less than about 0.15 inches of water, reduces or consolidates up to 40% of the droplets less than 100μ, and has other advantages in terms of cleanability, drainage, ease of maintenance, ruggedness, direction of the gas flow from the upper wall and roof surfaces of the tower and relatively uniform orientation of the gas flow toward a highly-efficient, horizontal-flow mist eliminator 140. The mist eliminator 140 is preferably of the baffle type, e.g. a zig-zag baffle of the type shown in the above Jones, et al. paper.

Figure 3:
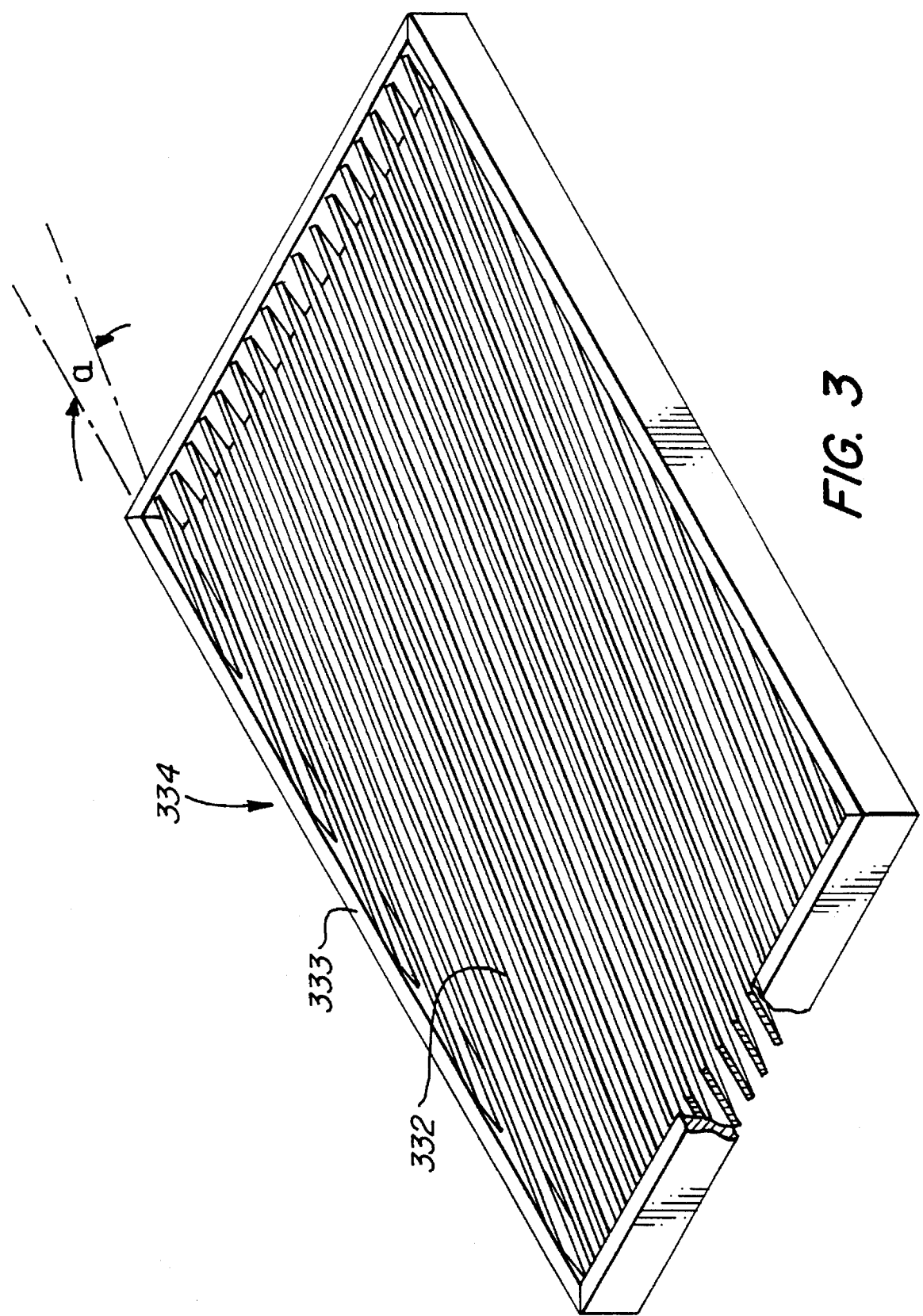
FIG. 3 is a perspective view of an alternative embodiment of an entrainment separator of the invention.

An alternative embodiment is illustrated in FIG. 3, showing a single assembly 334 of vanes 332 laid out in diagonal fashion in a flat panel supported by a frame 333. The vanes are oriented at an angle a (e.g., from about 15 to about 40°, preferably about 20°) with respect to the frame and a similar angle to the vertical as in the embodiment of FIG. 2.

It is important to note that vane assemblies illustrated in FIGS. 3 are not chevron shaped assemblies, but rather are flat projections between support members 136. Good drainage is facilitated by gravity acting on captured droplets through the drainage path afforded by the angle a and the angle b.

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

I claim:

1. An improved wet scrubbing process for reducing the concentration of $SO_2$ in flue gases, comprising:

(a) directing a flow of flue gas upwardly through a scrubbing tower;

(b) introducing a spray of droplets of an aqueous slurry of finely-divided calcium carbonate, calcium sulfate, calcium sulfite, and other non-reactive inerts to contact the flue gas in a vertical scrubbing section, the slurry descending through the tower countercurrently to the flow of flue gas and being collected as a liquid after contact; and (c) passing the flue gas through a single pass entrainment separator positioned above and across the vertical scrubbing section at an angle within the range of about 10° to about 45 degrees relative to the horizontal effective to reduce or consolidate a substantial quantity of droplets entrained in the gas and to also turn the direction of flow of the flue gas from the vertical said entrainment separator includes individual single-pass separator blades, said individual blades are oriented at an angle within the range of about 35° to about 55 degrees from the vertical.

2. A process according to claim 1 wherein the entrainment separator is effective to reduce the quantity of droplets by at least 40% and to turn the direction of flow of the flue gases by at least 45° from the vertical axis of the tower.

3. A process according to claim 1 wherein the flue gas is passed through a well-drained, horizontal flow mist eliminator downstream of the entrainment separator.

4. A process according to claim 1 wherein the vertical bulk gas velocity is greater than about 4.5 meters per second.

5. A process according to claim 1 wherein the entrainment separator causes a pressure drop of less than about 0.15 inches of water, and removes or consolidates at least 40% of droplets smaller than about 100μ Sauter mean diameter.

6. A process according to claim 1 wherein the entrainment separator utilizes single pass separator blades to collect droplets by impingement and to turn the gas in a direction most suitable for further mist elimination, the individual blades being held parallel to one another in each of a plurality of assemblies.

7. A process according to claim 1 wherein and the spacing between individual blades will typically be from about 40 to about 70% of the minor dimension of the individual blades.

8. A process according to claim 1 wherein the entrainment separator comprises a plurality of assemblies of individual blades, said assemblies being oriented at an angle in the range of from about 120° to about 150° with respect to one another, whereby said assemblies form a chevron pattern.

9. A process according to claim 1 wherein the blades are washed periodically by spraying wash water directly onto the blades from both the top and the bottom.

\* \* \* \* \*